United States Patent
Kim et al.

(10) Patent No.: US 10,350,965 B2
(45) Date of Patent: Jul. 16, 2019

(54) AIR EXTRACTOR GRILLE

(71) Applicants: Hyundai Motor Company, Seoul (KR); Kia Motors Corporation, Seoul (KR)

(72) Inventors: Seung Wook Kim, Seoul (KR); Sang Shin Lee, Gyeonggi-do (KR); Jae Hyun An, Gyeonggi-do (KR); Ja Sung Gu, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 723 days.

(21) Appl. No.: 13/887,573

(22) Filed: May 6, 2013

(65) Prior Publication Data
US 2014/0057543 A1   Feb. 27, 2014

(30) Foreign Application Priority Data
Aug. 27, 2012   (KR) .................. 10-2012-0093471

(51) Int. Cl.
  *B60H 1/26*   (2006.01)
  *B60H 1/24*   (2006.01)

(52) U.S. Cl.
  CPC .............. *B60H 1/249* (2013.01); *B60H 1/26* (2013.01)

(58) Field of Classification Search
  CPC .............. B60H 1/24; B60H 1/26; B60H 1/34
  USPC ........................................ 454/165, 164, 162
  See application file for complete search history.

(56) References Cited

U.S. PATENT DOCUMENTS

| | | | | |
|---|---|---|---|---|
| 1,223,903 A * | 4/1917 | Pickens | .................... | B60H 1/26 454/151 |
| 3,405,968 A * | 10/1968 | Feles | ..................... | B60H 1/248 454/164 |
| 4,691,623 A * | 9/1987 | Mizusawa | ..................... | 454/164 |
| 4,781,106 A * | 11/1988 | Frien | ............................. | 454/164 |
| 5,085,132 A * | 2/1992 | Ikeda | ..................... | B60H 1/249 454/158 |
| 5,167,574 A * | 12/1992 | Ikeda et al. | ................... | 454/164 |
| 5,205,781 A * | 4/1993 | Kanno et al. | ................. | 454/164 |

(Continued)

FOREIGN PATENT DOCUMENTS

| | | |
|---|---|---|
| JP | H04-035906 U | 3/1992 |
| JP | H06-078017 U | 1/1994 |

(Continued)

*Primary Examiner* — Steven B McAllister
*Assistant Examiner* — Samantha A Probst
(74) *Attorney, Agent, or Firm* — Mintz Levin Cohn Ferris Glovsky and Popeo, P.C.; Peter F. Corless (57) ABSTRACT

Disclosed herein is an air extractor grille. The air extractor grille includes a grille body and a grille cover. The grille body includes a plurality of openable flaps which are arranged vertically in a successive order in a vehicle body inside a rear bumper. The grille cover covers at least a portion of the grille body. The grille cover has a plurality of vent slots formed in a front surface of the grille cover and arranged vertically in a successive order as well. A block plate is bent from a lower end of each of the vent slots in such a way that the block plate protrudes outwards, thus preventing the vent slot from being directly exposed to the outside. Therefore, when the flaps open, foreign substances are prevented from directly entering the interior of the vehicle through the flaps.

9 Claims, 5 Drawing Sheets

(56) References Cited

U.S. PATENT DOCUMENTS

| | | | | |
|---|---|---|---|---|
| 5,247,912 | A * | 9/1993 | Boyesen et al. | 123/65 V |
| 5,492,505 | A * | 2/1996 | Bell | B60H 1/249 137/855 |
| 5,601,117 | A * | 2/1997 | Lewis | B60H 1/249 137/527.8 |
| 5,759,097 | A * | 6/1998 | Bernoville | B60H 1/249 137/512.1 |
| 5,794,733 | A * | 8/1998 | Stosel | B60K 13/02 180/68.1 |
| 5,823,870 | A * | 10/1998 | Emerling | B60H 1/249 137/512.15 |
| 5,897,435 | A * | 4/1999 | Thomas | B60H 1/265 454/128 |
| 6,085,854 | A * | 7/2000 | Nishikawa | B60K 1/04 180/68.5 |
| 6,135,543 | A * | 10/2000 | Esposito | B60H 1/249 296/190.09 |
| 6,210,266 | B1 * | 4/2001 | Barton | B29C 45/1676 137/855 |
| 6,468,148 | B1 * | 10/2002 | Furusawa et al. | 454/164 |
| 6,648,749 | B2 * | 11/2003 | Hayashi | B60H 1/249 454/162 |
| 6,780,098 | B2 * | 8/2004 | Nishida et al. | 454/155 |
| 7,137,880 | B2 * | 11/2006 | Omiya | B60H 1/249 454/162 |
| 7,762,876 | B2 * | 7/2010 | McClary | B60H 1/267 296/152 |
| 8,360,104 | B2 * | 1/2013 | Shereyk | B60H 1/249 137/852 |
| 8,419,513 | B2 * | 4/2013 | Weber | B60H 1/249 454/162 |
| 8,485,872 | B2 * | 7/2013 | Valencia, Jr. | B60H 1/249 123/73 AV |
| 8,651,924 | B1 * | 2/2014 | Jones | B64D 13/02 244/118.5 |
| 8,668,168 | B1 * | 3/2014 | Kelley et al. | 244/158.1 |
| 8,721,407 | B2 * | 5/2014 | Mandernach | B60H 1/265 454/130 |
| 9,097,353 | B2 * | 8/2015 | Loewe | B60H 1/249 |
| 9,321,326 | B2 * | 4/2016 | Carlson | B60H 1/249 |
| 9,440,511 | B2 * | 9/2016 | Hofmann | B60H 1/248 |
| 9,796,245 | B2 * | 10/2017 | Switzer | B60H 1/26 |
| 9,849,754 | B2 * | 12/2017 | Kim | B60H 1/249 |
| 2004/0253566 | A1 * | 12/2004 | Quinn | B60H 1/248 434/162 |
| 2007/0184772 | A1 * | 8/2007 | McConnell et al. | 454/139 |
| 2008/0076344 | A1 * | 3/2008 | Flowerday | B60H 1/249 454/162 |
| 2013/0097978 | A1 * | 4/2013 | Nagasaka | B01D 46/0043 55/332 |
| 2014/0057543 | A1 * | 2/2014 | Kim | B60H 1/249 454/165 |

FOREIGN PATENT DOCUMENTS

| | | |
|---|---|---|
| JP | H06-078017 | 11/1994 |
| JP | 2006-111157 A | 4/2006 |
| JP | 2009-119943 A | 6/2009 |
| KR | 10-1999-0017458 A | 3/1999 |
| KR | 10-2005-0080761 A | 8/2005 |
| KR | 10-2010-0023396 | 3/2010 |
| KR | 10-2010-0023396 A | 3/2010 |

* cited by examiner

PRIOR ART

Fig. 5

PRIOR ART

Fig. 6

AIR EXTRACTOR GRILLE

CROSS-REFERENCE TO RELATED APPLICATION

This application claims under 35 U.S.C. § 119(a) the benefit of Korean Patent Application No. 10-2012-0093471 filed Aug. 27, 2012, the entire contents of which are incorporated herein by reference.

BACKGROUND

1. Field of the Invention

The present invention relates to an air extractor grille which is installed in a vehicle body inside a rear bumper of the vehicle so that when air pressure inside the vehicle is high enough, air inside the vehicle is discharged through the air extractor grille.

2. Description of the Related Art

As is well known to those skilled in the art, a defogging function is required to secure a clear front view through the windows of most vehicles. Additionally, doors must be easy to open and close when getting in or out of the vehicle. For this, vehicles typically employ a ventilation feature. At present, most vehicles include an air extractor grille which is provided for ventilation. This grille is typically located in the rear of the vehicle body.

The functions of the air extractor grille include 1. a ventilation: rapidly discharging internal air when the air pressure in the vehicle increases, 2 a water sealer: preventing water from entering the interior of the vehicle in the case of, e.g., rain, wet roads, etc., 3. a foreign substance blocker: preventing outside air/foreign substances from entering the interior of the vehicle. These air extractor grilles perform the above function by operating a directional flap in the same manner as that of a valve.

For instance, a door can be used so that once shut, transfer of noise generated outside the vehicle into the interior of the vehicle is reduced, and water is prevented from entering the interior of the vehicle while the vehicle is being driven, thereby enhancing the marketability of the vehicle. As such, flap that is structured to open and close may be used to achieve the above-stated purposes.

However, in such a flap structure, when the vehicle hits a bump or bounces, the flap may be forcibly opened by inertia, thus causing external foreign substances to be drawn into the vehicle body through the open flap. Therefore, an air extractor grille is required, which can effectively cope with the unexpected opening of the flap attributable to inertia and thus prevent foreign substances from entering the interior of the vehicle.

It is to be understood that the foregoing description is provided to merely aid the understanding of the present invention, and does not mean that the present invention falls under the purview of the related art which was already known to those skilled in the art.

SUMMARY

Accordingly, the present invention has been made keeping in mind the above problems occurring in the prior art, and an object of the present invention is to provide an air extractor grille which can solve a problem of foreign substances being drawn into a vehicle body through a flap when the flap is forcibly opened by inertia; for example, when the vehicle hits a bump or bounces.

In order to accomplish the above object, the present invention provides an air extractor grille, including: a grille body having a plurality of flaps structured to open and close. The flap may be arranged vertically in a successive order in a vehicle body inside a rear bumper of the vehicle. A grille cover may also be included that covers at least a portion of the grille body. The grille cover may have a plurality of vent slots formed in a front surface of the grille cover and may be arranged vertically in a successive order, with a block plate bent from a lower end of each of the vent slots in such a way that the block plate protrudes outward, thus preventing the vent slot from being directly exposed to the outside. Thus, when the flaps open, foreign substances are prevented from directly entering an interior of the vehicle through the flaps.

In the exemplary embodiment of the present invention, the grille cover may cover medial and lower portion of the grille body. The grille cover may have a rectangular box shape, wherein the front surface of the grille cover may cover the grille body, an upper end of the grille cover may be open, and side surfaces and a lower surface of the grille cover may be coupled to the grille body.

The vent slots of the grille cover may be formed such that heights of the vent slots are reduced from a bottom of the grille cover to a top. Also, the grille cover may be configured such that distances between the vent slots are uniform.

A height of each of the block plates of the grille cover may be equal to a height of the corresponding vent slot. The block plates of the grille cover may be configured such that heights of the block plates are reduced from a bottom of the grille cover to a top.

The block plates of the grille cover may be configured such that angles at which the block plates are bent from the grille cover are reduced from a bottom of the grille cover to a top, alternatively or in addition to decreasing the height. The block plates of the grille cover may be configured such that extents to which the block plates protrude outwards from the grille cover are reduced from a bottom of the grille cover to a top.

Furthermore, in some exemplary embodiments of the present invention, the grille cover may be configured in such a way that each of the vent slots is formed by cutting an upper end and opposite side ends of a portion of the grille cover and a cut-out portion is bent and protruded outwards from the grille cover to integrally form the block plate.

The lower surface of the grille cover may be inclined sideways, and a drain slot may be formed in a lowermost portion of the inclined lower surface so that foreign substances are discharged downwards to the outside through the drain slot.

As stated above, the grille cover may have a three dimensional rectangular shape, wherein the front surface of the grille cover may cover the grille body, an upper end of the grille cover may be open, and side surfaces and a lower surface of the grille body may be coupled to the grille body. Heights of the vent slots may be reduced from a bottom of the grille body to a top, and heights of the block plates may be equal to the heights of the corresponding vent slots and be reduced from the bottom of the grille body to the top.

As described above, in an air extractor grille according to the exemplary embodiment of the present invention is structured so that even when flaps undesirably open because of inertia when a vehicle is driving on a bumpy road, foreign substances can be effectively prevented from being drawn into the vehicle body via the flaps. Furthermore, openings within the air extractor grille are oriented upwards, so penetration of foreign substances from a lower portion of the air extractor grille can be blocked effectively. Moreover, the air extractor grille is structured such that the sizes of the openings are differentiated in a predetermined pattern, thus more effectively preventing the penetration of foreign substances into the vehicle body.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

It is understood that the tem "vehicle" or "vehicular" or other similar tem as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, an air extractor grille according to an exemplary embodiment of the present invention will be described in detail with reference to the attached drawings. Reference now should be made to the drawings, in which the same reference numerals are used throughout the different drawings to designate the same or similar components.

Figure 1:
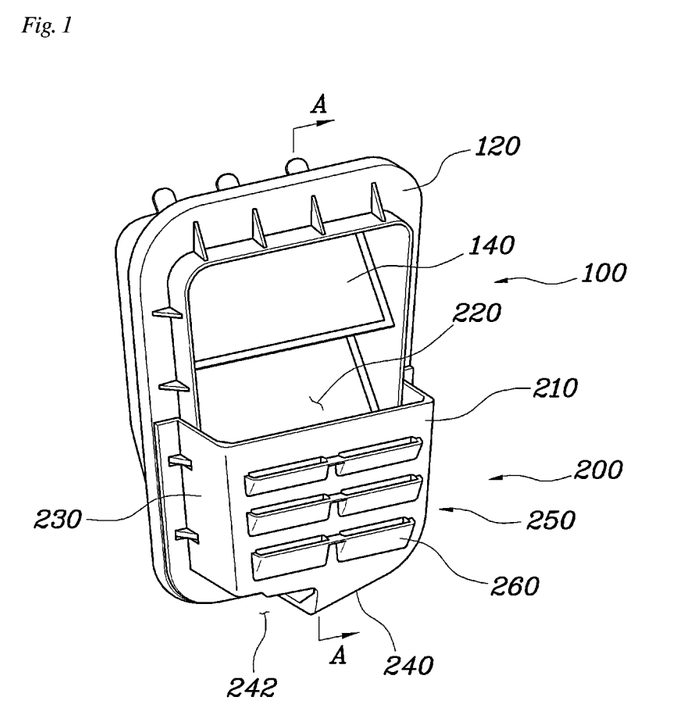
FIGS. 1 and 2 are perspective views illustrating an air extractor grille, according to an exemplary embodiment of the present invention.
Figure 2:
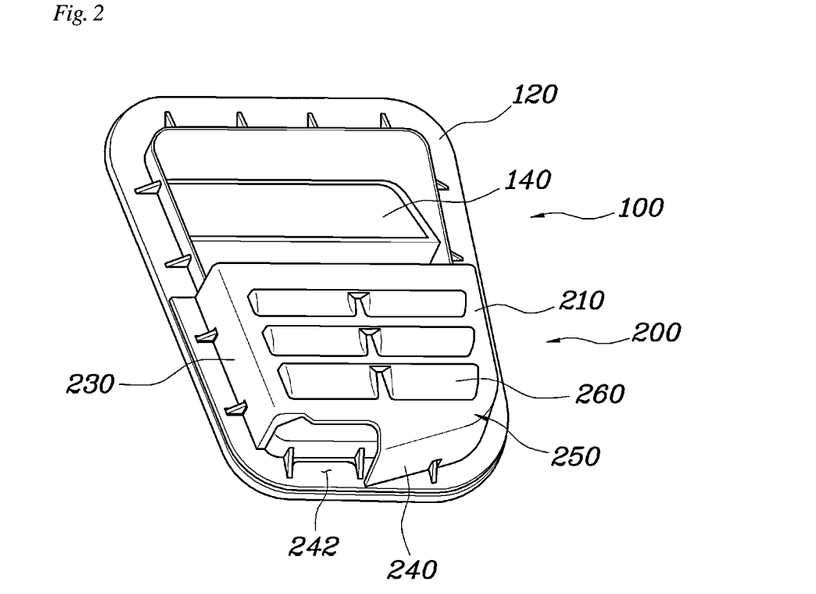
Figure 3:
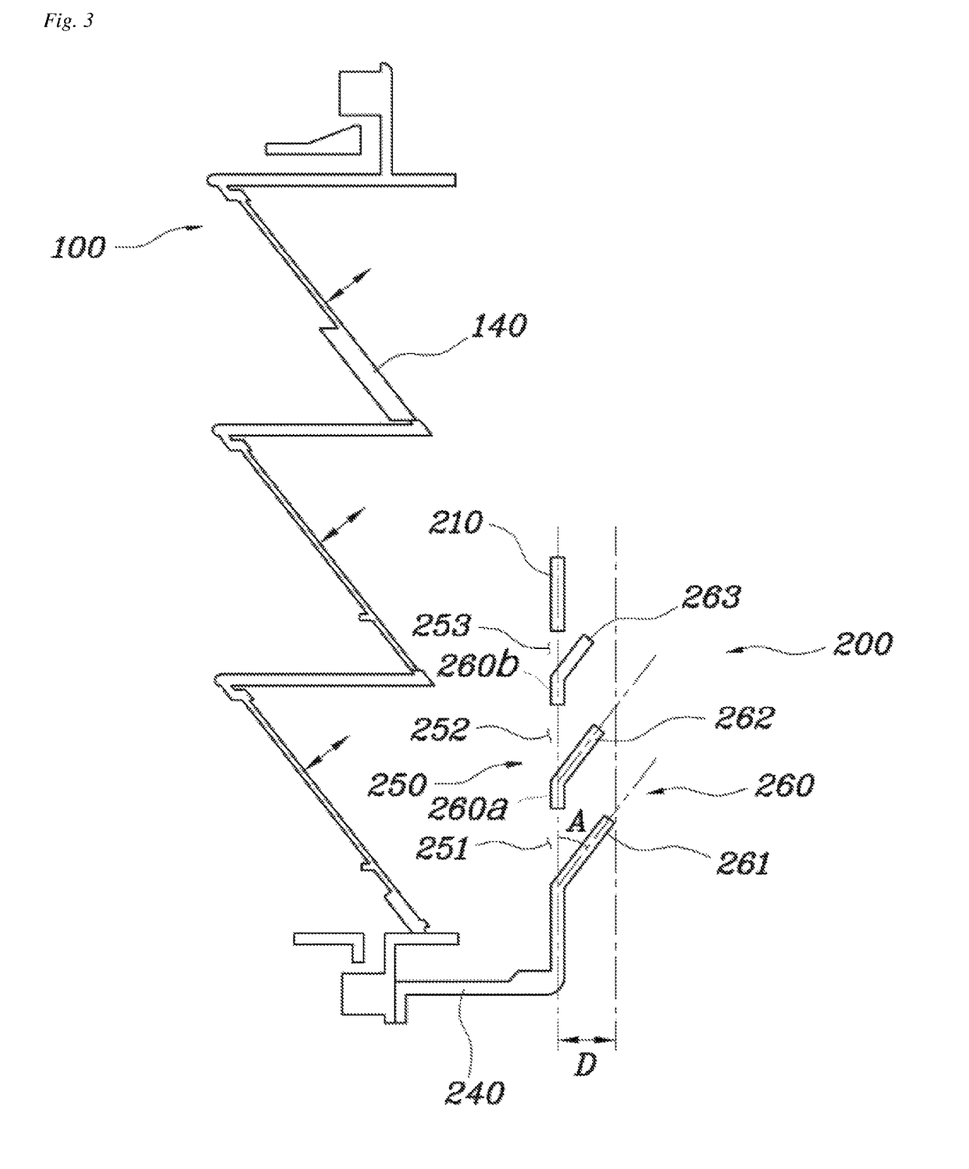
FIG. 3 is a sectional view taken along line A-A of FIG. 1 to illustrate the exemplary air extractor grille of the present invention.

FIGS. 1 and 2 are perspective views illustrating an air extractor grille, according to an exemplary embodiment of the present invention. FIG. 3 is a sectional view taken along line A-A of FIG. 1 to illustrate the air extractor grille of the present invention.

The air extractor grille of the present invention includes a grille body 100 and a grille cover 200. The grille body 100 includes a plurality of flaps 140 that open and close accordingly. The flaps are arranged vertically in a successive order in a vehicle body inside a rear bumper. The grille cover 200 is shaped to cover at least a portion of grille body 100. A plurality of vent slots 250 are formed in a front surface 210 of the grille cover 200 and arranged vertically in a successive order. A block plate 260 is bent from a lower end of each vent slot 250 in such a way that it protrudes outwards. The block plate 260 prevents the vent slots 250 from being directly exposed to the outside. When the flaps 140 open, the grille cover 200 prevents foreign substances from directly entering the interior of the vehicle through the flaps 140.

The grille body 100 includes the flaps 140 that operably open and close ("openable flaps"). The flaps 140 are configured such that they can open only outwards so that only when the interior air pressure is high enough to open the flap compared to the outside pressure so the flaps 140 open to discharge the internal air to the outside.

The flaps 140 may be installed in the vehicle body inside the rear bumper by a separate fixing guide 120. These several flaps 140 are arranged vertically in a successive order in the fixing guide 120.

Meanwhile, the grille cover 200 which at least partially covers the grille body 100 is provided on an outer surface of the grille body 100. The vent slots 250 which are arranged vertically in a successive order are formed in the front surface 210 of the grille cover 200. The block plates 260 are bent from the lower ends of the respective vent slots 250 such that they protrude outwards therefrom, whereby the vent slots 250 are prevented from being directly exposed to the outside by the vent plates. Thus, when the flaps 140 open, the grille cover 200 prevents foreign substances from directly entering the interior of the vehicle through the flaps 140.

When the vehicle is operated on a bumpy road, the flaps 140 may undesirably open because of inertia resulting from bumps or rebounds, despite a comparatively low internal air pressure. In the case of such a bumpy road, typically, there are many foreign substances in the air around the vehicle. If the flaps 140 that have been closed are abruptly opened by external factors, external air may be drawn into the interior of the vehicle by a pressure difference. In this case, foreign substances such as dust may enter the vehicle body. To prevent this problem, in the present invention, the separate grille cover is provided around the flaps 140.

The grille cover 200 is shaped to cover the grille body 100, and prevents foreign substances from entering the interior of the vehicle through the flaps 140. The vent slots 250 are arranged vertically in a successive order formed in the front surface 210 of the grille cover 200 so that when the flaps 140 open, the internal air can be appropriately discharged to the outside.

Particularly, the block plates 260 are provided around each vent slot 250 to prevent the vent slot 250 from being directly exposed to the outside, thus preventing foreign substances from directly reaching the flaps 140 when the flaps 140 open. Here, each block plate 260 is bent outwards and upwards, rather than inwards, and is protruded from the lower end of the corresponding vent slot 250, rather than from an upper end thereof. As such, each vent slot 250 communicates with the outside through space defined between the upper end of the vent slot 250 and an upper edge of the corresponding block plate 260, whereby the inflow of external air into the vehicle can be effectively blocked.

Figure 4:
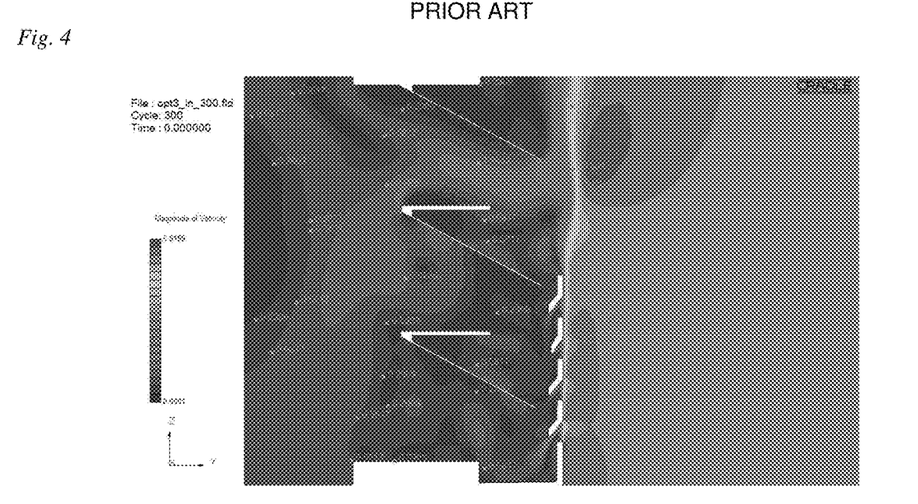
FIGS. 4 and 5 are views showing analysis of outside air inflow according to comparative examples of the prior art.
Figure 5:
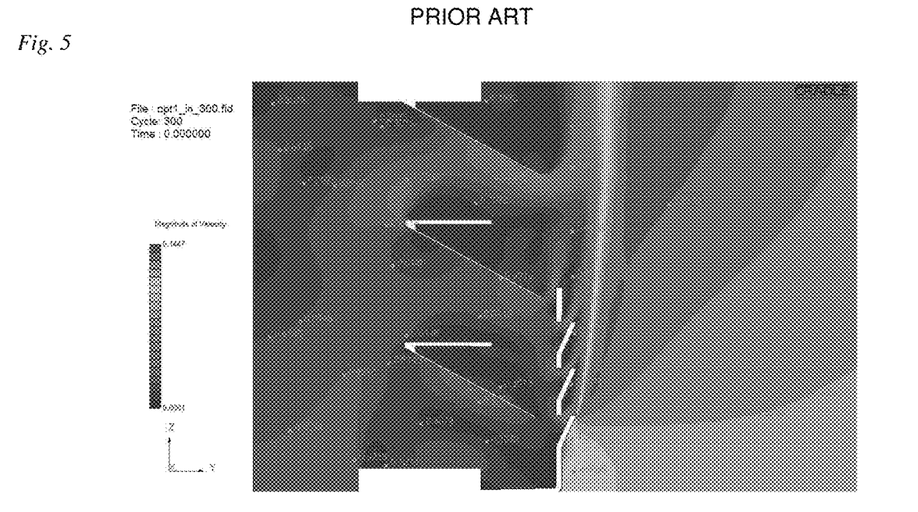
Figure 6:
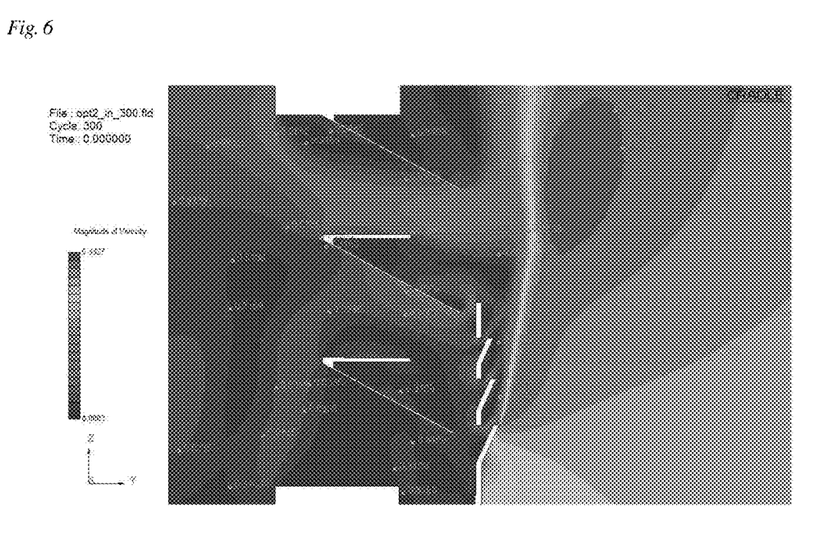
FIG. 6 is a view showing analysis of outside air inflow of the air extractor grille of FIG. 1.

FIGS. 4 and 5 are views showing analysis of external air inflow according to comparative examples of the prior art. FIG. 6 is a view showing analysis of external air inflow of the air extractor grille of FIG. 1. Particularly, comparing FIGS. 4 and 6 to each other, the example of FIG. 4 is the case where the block plates are bent inwards from the grille cover, while the example of FIG. 6 is the case where the block plates are bent outwards from the grille cover. It can be understood that the case where the block plates are bent outwards can more effectively block the external air at the moment of the inflow of the external air.

Meanwhile, the grille cover 200 may be structured such that it covers at least a lower half of the grille body 100 to allow the internal air to be effectively discharged through an upper half of the grille body 100. This configuration is due to the fact that foreign substances are drawn mainly through the lower half of the grille body 100 during the external air inflow process, and given this, if the upper half of the grille body 100 is maintained in the completely open state, unnecessary flow resistance can be minimized when the internal air is discharged to the outside.

Furthermore, the grille cover 200 has a three dimensional rectangular box shape. The front surface 210 of the grill cover covers the grille body 100, an upper end 220 of the grille cover 200 may be open, and side surfaces 230 and a lower surface 240 thereof are coupled to the grille body 100. As such, the side portions and lower portion of the grille body 100, through which foreign substances mainly try to enter the interior of the vehicle, are closed, but the upper portion of the grille body 100, through which foreign substances seldom enter the interior of the vehicle, is open. Thereby, foreign substances can be effectively blocked, while the flow resistance of the internal air that is discharged to the outside can be minimized.

Preferably, the vent slots 250 of the grille cover 200 are formed such that the heights of the vent slots 250 are gradually reduced from the bottom of the grille cover 200 to the top. In other words, as shown in FIG. 3, a first vent slot 251, a second vent slot 252 and a third vent slot 253 are formed in such a way that the heights thereof are gradually reduced to the third slot 253 which is disposed at the uppermost position. Further, the heights of the block plates 260 of the grille cover 200 are the same as those of the corresponding vent slots 250. That is, the heights of the block plates 260 are also gradually reduced from the bottom of the grille cover 200 to the top. In the case of FIG. 3, a first block plate 261, a second block plate 262 and a third block plate 263 are formed such that the heights thereof are gradually reduced to the third block plate 263 which is disposed at the uppermost position.

The effect of the height differences of the vent slots 250 and the block plates 260 can be easily understood by comparing FIGS. 5 and 6 to each other. FIG. 5 illustrates the case where the vent slots and the block plates have the same height. FIG. 6 illustrates the case where the heights of the vent slots and the block plates are reduced from the bottom of the grille cover to the top.

Referring to these drawings, it can be appreciated that in the case of FIG. 6, a red area where air flow is strongest is biased finely further outwards around the block plates compared to that of the case of FIG. 5. This means that the inflow rate of external air around the grille cover in the case of FIG. 6 is lower than that in the case of FIG. 5. Thereby, in the case of FIG. 6, the possibility of penetration of foreign substances in the external air into the grille cover can also be reduced. In conclusion, it can be understood that if the heights of the vent slots 250 and the block plates 260 of the grille cover 200 are gradually reduced from the bottom of the grille cover 200 to the top, the penetration of foreign substances can be more effectively prevented.

Preferably, as shown in FIG. 3, the grille cover 200 is configured such that distances between the vent slots 250 are uniform. In other words, the grille cover is configured such that heights of vertical walls (260a, 260b) between the vent slots are uniform. In addition, the block plates 260 of the grille cover 200 are configured such that angles at which the block plates 260 are bent from the grille cover 200 are gradually reduced from the bottom of the grille cover 200 to the top, or extents to which the block plates 260 protrude outwards from the grille cover 200 are reduced from the bottom of the grille cover 200 to the top. As can be understood from FIGS. 5 and 6, this is also due to the fact that to the extents to which the block plates 260 protrude outwards from the grille cover 200 are reduced from the bottom to the top, the inflow rate of external air is reduced.

Similarly, when the flow of internal air that is being discharged to the outside is analyzed, it can be appreciated that if the extents to which the block plates 260 protrude outwards from the grille cover 200 are reduced from the bottom to the top, the flow rate of internal air is increased compared to the alternative. Therefore, this structure is advantageous for discharging internal air while more effectively resisting the inflow of external air.

Furthermore, if the grille cover 200 is structured in such a way that each vent slot 250 is formed by cutting an upper end and opposite side ends of a portion of the grille cover 200 and the cut-out portion is bent and protruded from the grille cover 200 to integrally form the block plate 260, the grille cover 200 can be easily manufactured only by a single forming process.

Moreover, the lower surface 240 of the grille cover 200 may be inclined sideways. A drain slot 242 may be formed in the lowermost portion of the inclined lower surface 240 so that foreign substances can be discharged downwards to the outside from the grille cover 200 through the drain slot 242. Thereby, even if foreign substances are drawn into the grille cover 200, they can be easily discharged to the outside, thus preventing them from impeding the discharge of the internal air. In addition, even though some external air may be drawn into the vehicle body, the possibility of foreign substances being drawn into the vehicle body along with the external air can be remarkably reduced.

Table 1 shows the result of a pressure reduction ratio test of several examples when the flaps open and internal air is discharged to the outside. Comparative example 1 is the case when a typical grille cover having no vent slot is installed. Comparative example 2 is the case when block plates are bent inwards. Comparative example 3 is the case where block plates are bent outwards but the heights of the block plates are the same. The exemplary embodiment is the case where the heights of the block plates and the vent slots are reduced from the bottom to the top.

TABLE 1

| | Comparative example 1 | Comparative example 2 | Comparative example 3 | Embodiment |
|---|---|---|---|---|
| Vent slot | Absence | Presence | Presence | Presence |
| Direction of block plates | — | Inwards | Outwards | Outwards |
| Heights of block plates | — | Same | Same | Reduced to top |
| Pressure reduction ratio during discharge of internal air | Reference | Reduced by about 42% | Reduced by about 48% | Reduced by about 48% |

As can be understood from the result of the above test, in the cases of Comparative example 3 and the exemplary embodiment of the present invention where the vent slots are present and the block plates are bent outwards, the pressure of internal air is remarkably reduced during the discharge of internal air, compared to the other cases, that is, the flow resistance of the inside air is minimized.

Meanwhile, Table 2 shows the result of a flow rate test of the several examples when external air is drawn into the vehicle body.

TABLE 2

| | Comparative example 1 | Comparative example 2 | Comparative example 3 | Embodiment |
|---|---|---|---|---|
| Vent slot | Absence | Presence | Presence | Presence |
| Direction of block plates | — | Inwards | Outwards | Outwards |
| Heights of block plates | — | Same | Same | Reduced to top |
| Inflow rate of external air | Nothing | 2.23 | 1.58 | 1.53 |

As can be understood from the result of this test, the inflow rate of external air is remarkably reduced in the case of the exemplary embodiment of the present invention where the vent slots are present, the block plates are bent outwards, and the heights of the vent slot and the block plates are reduced from the bottom to the top, compared to that of the other cases. Therefore, it can be appreciated that in the case of the exemplary embodiment of the present invention, the possibility of penetration of foreign substances during the inflow of external air is also lowest.

As described above, in an air extractor grille according to the exemplary embodiment of the present invention, even when flaps undesirably open because of inertia when a vehicle is driving on a bumpy road, foreign substances can be effectively prevented from being drawn into the vehicle body via the flaps. Furthermore, openings of the air extractor grille are oriented upwards, so penetration of foreign substances from a lower portion of the air extractor grille can be blocked. Moreover, the air extractor grille is configured such that the sizes of the openings are different in a predetermined pattern, thus more effectively preventing the penetration of foreign substances into the vehicle body.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. An air extractor grille in a vehicle body facing with a rear bumper fixedly mounted to the vehicle body, comprising:
    a grille body including a plurality of flaps structured to open and close opening and closing to facilitate one-way flow through a plurality of air passages and arranged vertically in a successive order in the vehicle body facing with a rear bumper fixedly mounted to the vehicle body; and
    a grille cover structured to cover at least a portion of the grille body, the grille cover having a plurality of vent slots formed in a front surface of the grille cover and arranged vertically in a successive order, wherein each of the plurality of vent slots has a block plate bent from a lower end of each of the vent slots in such a way that the block plate protrudes upwards to prevent each of the vent slots from being directly exposed to an outside, wherein when the flaps open, foreign substances are prevented from directly entering an interior of a vehicle through the flaps by the grille cover,
    wherein the grille cover has a rectangular box shape, wherein the front surface of the grille cover covers the grille body, an upper end of the grille cover is open, and side surfaces and a lower surface of the grille cover are coupled to the grille body, and
    wherein the vent slots of the grille cover are formed such that heights of the vent slots are gradually reduced along the front surface of the grille cover from a bottom of the grille cover to a top of the grille cover to reduce penetration of foreign substances.

2. The air extractor grille as set forth in claim 1, wherein the grille cover covers medial and lower portion of the grille body.

3. The air extractor grille as set forth in claim 1, wherein the grille cover is configured such that heights of vertical walls between the vent slots are uniform.

4. The air extractor grille as set forth in claim 1, wherein a height of each of the block plates of the grille cover is equal to a height of the corresponding vent slot.

5. The air extractor grille as set forth in claim 1, wherein the block plates of the grille cover are configured such that heights of the block plates are reduced from a bottom of the grille cover to a top.

6. The air extractor grille as set forth in claim 1, wherein the block plates of the grille cover are configured such that angles at which the block plates are bent from the grille cover are reduced from a bottom of the grille cover to a top.

7. The air extractor grille as set forth in claim 1, wherein the block plates protruding outwards from the grille cover are reduced in size from a bottom of the grille cover to a top.

8. The air extractor grille as set forth in claim 1, wherein the grille cover is configured in such a way that each of the vent slots is formed by cutting an upper end and opposite side ends of a portion of the grille cover and a cut-out portion is bent and protruded outwards from the grille cover to integrally form the block plate.

9. The air extractor grille as set forth in claim 1, wherein the lower surface of the grille cover is angled sideways, and a drain slot is formed in a lowermost portion of the angled lower surface so that foreign substances are discharged downwards to the outside through the drain slot.

* * * * *